United States Patent
Gohil et al.

(10) Patent No.: US 11,761,851 B1
(45) Date of Patent: Sep. 19, 2023

(54) BACKLASH MEASUREMENT SYSTEM FOR AN ELECTROMECHANICAL ACTUATOR

(71) Applicants: Safran Landing Systems Canada Inc., Ajax (CA); Safran Landing Systems, Velizy-Villacoublay (FR)

(72) Inventors: Aakash Gohil, Toronto (CA); Andrew Michael Ellis, Guelph (CA); Graeme Peter Arthur Klim, Vélizy-Villacoublay (FR); Dorian Tercier, Moissy-Cramayel (FR)

(73) Assignees: Safran Landing Systems Canada Inc., Ajax (CA); SAFRAN LANDING SYSTEMS, Velizy-Villacoublay (FR)

( * ) Notice: Subject to any disclaimer, the term of this patent is extended or adjusted under 35 U.S.C. 154(b) by 0 days.

(21) Appl. No.: 17/828,515

(22) Filed: May 31, 2022

(51) Int. Cl.
 *G01M 13/021* (2019.01)
 *F16H 25/20* (2006.01)
 *B61F 13/00* (2006.01)

(52) U.S. Cl.
 CPC .......... *G01M 13/021* (2013.01); *F16H 25/20* (2013.01); *B61F 13/00* (2013.01); *F16H 2025/2081* (2013.01)

(58) Field of Classification Search
 CPC ................ G01M 13/021; F16H 25/20; F16H 2025/2081; F16H 25/2209; F16H 57/12; F16H 25/2003; B61F 13/00
 See application file for complete search history.

(56) References Cited

U.S. PATENT DOCUMENTS

| | | | | |
|---|---|---|---|---|
| 3,766,790 | A * | 10/1973 | Weir | B64C 29/0033 475/8 |
| 5,725,184 | A * | 3/1998 | Kang | B64C 13/06 74/478 |
| 5,946,981 | A * | 9/1999 | Ide | B64C 27/72 74/89.23 |
| 9,604,798 | B2 | 3/2017 | Bambrogan et al. | |
| 10,549,848 | B2 | 2/2020 | Klim et al. | |
| 2011/0253832 | A1* | 10/2011 | Wildman | B64C 9/02 74/89.32 |
| 2013/0299631 | A1* | 11/2013 | Tucker | B64C 25/14 244/102 R |

(Continued)

FOREIGN PATENT DOCUMENTS

JP 2001004320 A * 1/2001 ............ F16H 57/12

*Primary Examiner* — David M Fenstermacher
(74) *Attorney, Agent, or Firm* — CHRISTENSEN O'CONNOR JOHNSON KINDNESS PLLC

(57) ABSTRACT

A drive system includes a motor having a rotatable output shaft that is operably coupled to a lead screw by a transmission that converts rotary output of the motor into linear translation of the lead screw. The drive system further includes a position sensor configured to sense a position of the lead screw. A method for determining a backlash of the drive system includes the steps of sensing an initial position and driving the lead screw in a first direction to a calculated second position by controlling the motor to rotate the output shaft an amount that corresponds to a distance between the initial position and the calculated second position. The method further includes the steps of sensing an actual second position of the lead screw; and determining a backlash value according to a difference between the calculated second position and the actual second position.

15 Claims, 7 Drawing Sheets

(56) References Cited

U.S. PATENT DOCUMENTS

| | | | |
|---|---|---|---|
| 2013/0313358 A1* | 11/2013 | Hale | F16H 25/2204 244/99.3 |
| 2015/0285350 A1* | 10/2015 | Quenerch'Du et al. | F16H 25/2454 74/89.37 |
| 2016/0025199 A1* | 1/2016 | Boone | H02K 7/116 74/89.38 |

* cited by examiner

BACKLASH MEASUREMENT SYSTEM FOR AN ELECTROMECHANICAL ACTUATOR

BACKGROUND

Magnetically levitated ("maglev") transportation systems, such as Hyperloop vehicles, provide the potential to move passengers and cargo at faster speeds and with improved efficiency compared to currently utilized modes of transportation. These systems employ vehicles that include one or more pressurized capsules to carry passengers and/or cargo through evacuated, i.e., low pressure, tubes. When traveling at high speeds, the vehicles are levitated by magnetic fields, compressed air, or other suitable means. By reducing/eliminating the high-speed air resistance and the friction inherent in the wheels of known vehicles, maglev systems are able to provide greater travel speeds and improved efficiency. Examples of transportations systems with levitated capsules are disclosed in U.S. Pat. No. 9,604,798, ("Bambrogan et al."), which is currently assigned to Hyperloop Technologies, Inc., the disclosure of which is expressly incorporated herein When traveling at low speeds or stopped, the vehicles do not levitate, but are instead supported by a support system that includes a plurality of independently controlled landing gear assemblies. Like aircraft landing gear, the maglev support systems reciprocate between an extended (deployed) position and retracted (stowed) position by extending and retracting the individual landing gear assemblies. When the vehicles are levitated, the support systems are retracted, and the wheels of the landing gear assemblies do not contact the ground. When the vehicles are traveling at low speeds or stopped, the support systems are extended so that the wheels of the landing gear assemblies contact parallel track to support the vehicles.

In some embodiments, the landing gear assemblies are grouped on two or more independent bogies (like a train). Each landing gear assembly includes a wheel assembly that is extendable and retractable by an actuator. The actuator, which may be hydraulic, electric, pneumatic, etc., is configured to control the position of the wheel assembly so that the landing gear assemblies control the height of the vehicle relative to the ground interface (track) when the vehicle is supported by the support system.

FIG. 1 shows an embodiment of a known landing gear 10 suitable for use with a maglev vehicle. The landing gear 10 is disclosed in U.S. Pat. No. 10,549,848 ("Klim et al."), which is currently assigned to Safran Landing Systems Canada Inc., the disclosure of which is expressly incorporated herein. The landing gear 10 includes wheel assembly 12 that is selectively raised and lowered by a drive assembly 14 to retract and extend, respectively, the landing gear 10.

The drive assembly 14 includes a motor 16 mounted to a housing 18. The motor provides rotary motion to a transmission (not shown) disposed within the housing 18. The transmission utilizes rotary input from the motor 16 to drive reciprocating translation of a cylinder 20. As the cylinder 20 reciprocates along a central axis, the wheel assembly 12, which is coupled to the cylinder 20, reciprocates between the raised and lowered positions

SUMMARY

The present disclosure provides examples of drive systems, such as for a landing gear, and methods for determining the backlash to the drive systems. In an embodiment, a drive system includes a motor having a rotatable output shaft that is operably coupled to a lead screw by a transmission that converts rotary output of the motor into linear translation of the lead screw. The drive system further includes a position sensor configured to sense a position of the lead screw. In an embodiment, the method for determining a backlash of the drive system includes the steps of sensing an initial position and driving the lead screw in a first direction to a calculated second position by controlling the motor to rotate the output shaft an amount that corresponds to a distance between the initial position and the calculated second position. The method further includes the steps of sensing an actual second position of the lead screw; and determining a backlash value according to a difference between the calculated second position and the actual second position.

In any embodiment, the method further comprises the step of driving the lead screw a predetermined distance in a second direction before the step of sensing the initial position.

In any embodiment, the method further comprises repeating the steps of the method to determine a plurality of backlash values.

In any embodiment, the method further comprises the step of determining a confidence level according to the plurality of backlash values.

In any embodiment, the step of determining a confidence level comprises calculating a standard deviation of the plurality of backlash values.

In any embodiment, a standard deviation is calculated after each backlash value is determined.

In any embodiment, the confidence level is achieved when each of a predetermined number of subsequent standard deviations decreases relative to the previous standard deviation.

In any embodiment, the method further comprises the steps of driving the lead screw in the second direction to a second calculated initial position by controlling the motor to rotate the output shaft an amount that corresponds to a distance between the actual second position and the second calculated initial position; sensing an actual second initial position of the lead screw; and determining a second backlash value according to a difference between the calculated second initial position and the actual second initial position.

In any embodiment, the initial position and the calculated second initial position are the same.

In any embodiment, the method further comprises repeating the steps to determine a plurality of backlash values.

In any embodiment, the method further comprises the step of determining a confidence level according to the plurality of backlash values.

In an embodiment, a drive system comprises a motor having a rotatable output shaft; a transmission operably coupled to the output shaft; a lead screw operably coupled to the transmission, wherein the transmission converts rotary output of the motor into linear translation of the lead screw; a position sensor configured to sense a position of the lead screw; and a controller configured to control rotation of the output shaft of the motor and to receive signals from the sensor corresponding to the position of the lead screw. The controller is programmed to perform the steps of sensing an initial position; extending the lead screw to a calculated second position by controlling the motor to rotate the output shaft an amount that corresponds to a distance between the initial position and the calculated second position; sensing an actual second position of the lead screw; and determining a backlash value according to a difference between the calculated second position and the actual second position.

In any embodiment, the lead screw is an acme screw

In any embodiment, the drive system further comprises a target mounted to the lead screw, the position sensor being configured to sense a position of the target.

In any embodiment, a maglev vehicle comprises a landing gear with a disclosed drive system, wherein linear translation of the lead screw drives extension and retraction of the landing gear.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
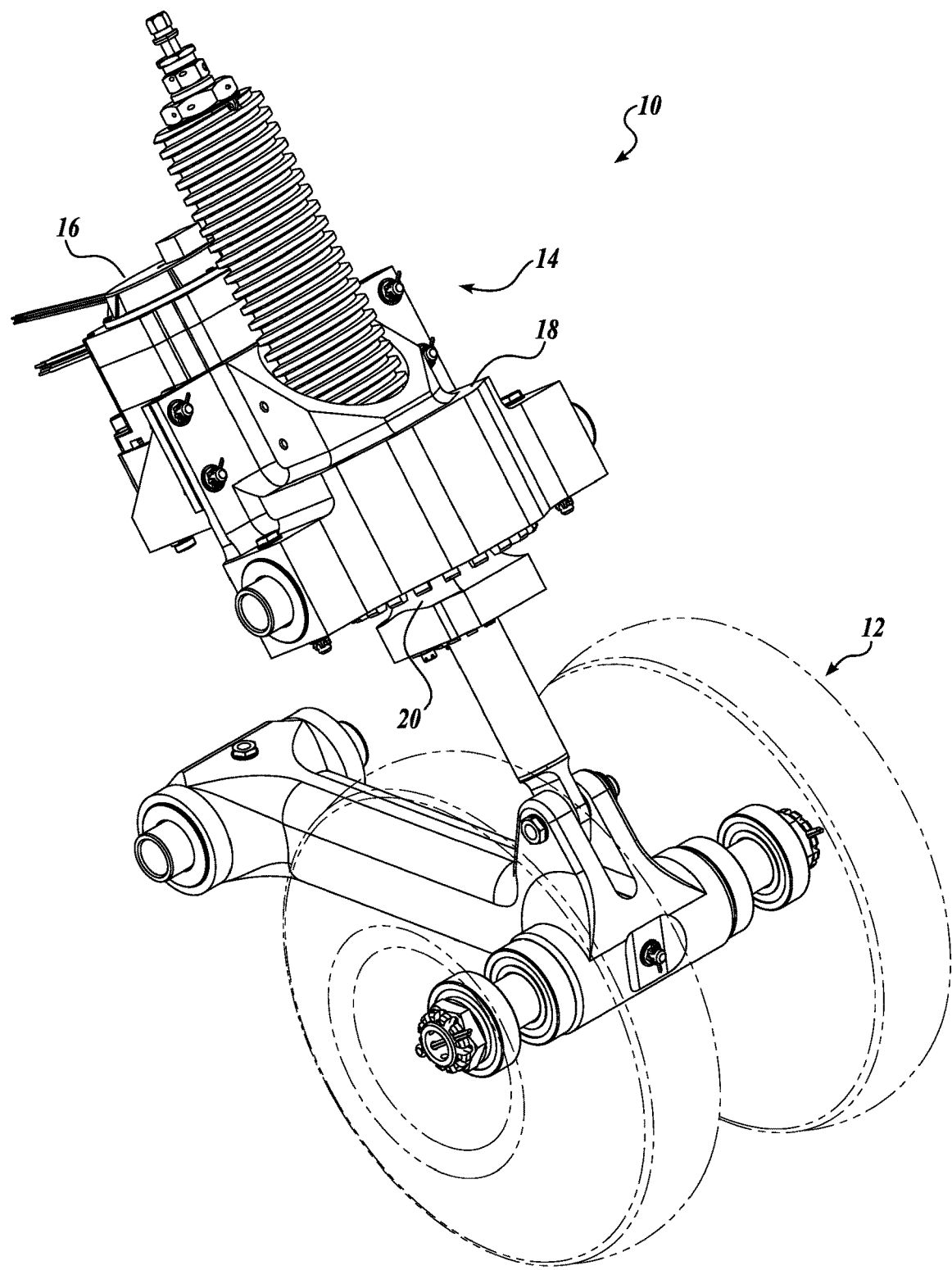
FIG. 1 shows an isometric view of a known deployable and retractable landing gear.
Figure 2:
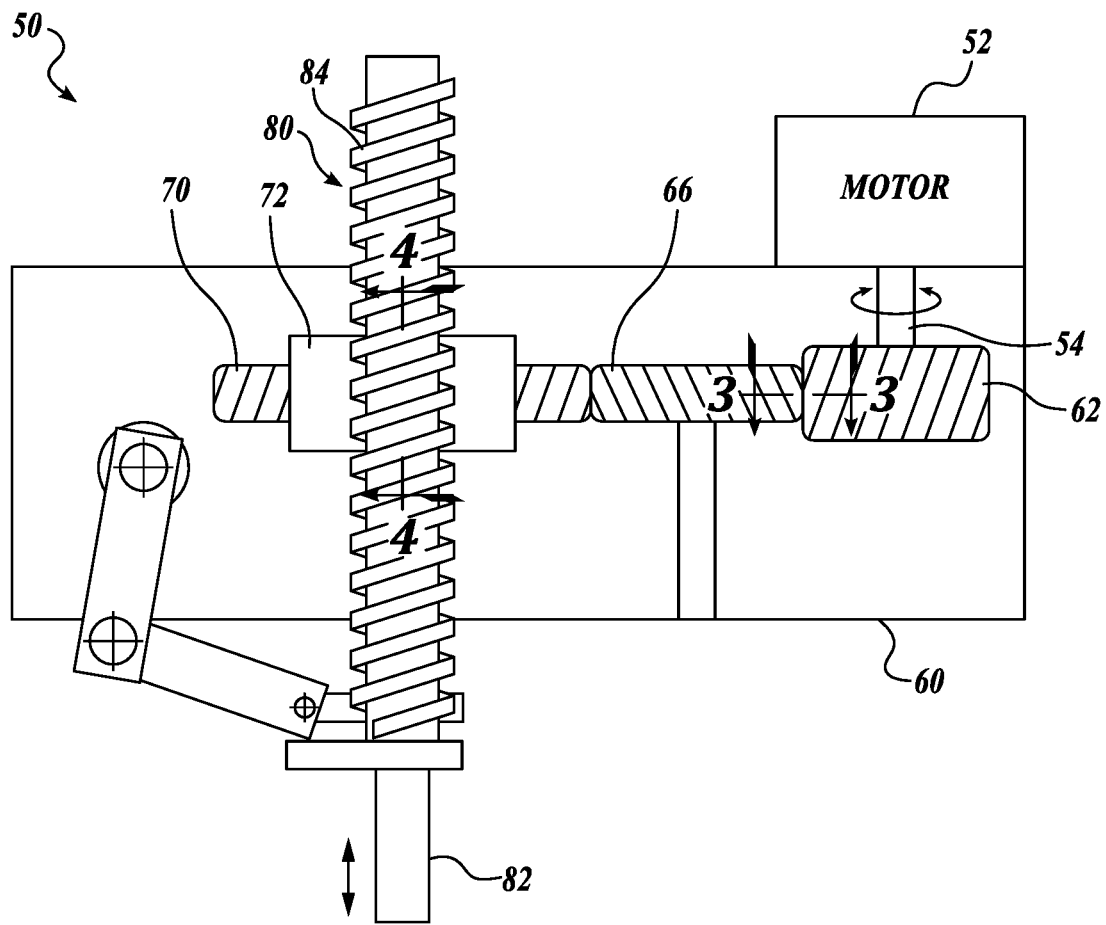
FIG. 2 shows a schematic view of a representative drive system suitable for use with the landing gear shown in FIG. 1.

FIG. 2 shows a schematic view of a drive system 50 suitable for use with the landing gear 10 shown in FIG. 1. The drive system 50 includes a motor 52, a transmission 60, and a lead screw 80. The transmission 60 is operably coupled to the motor 52 and utilizes the rotary output of the motor 52 to drive translation of the lead screw 80. A portion of a piston rod 82 is slidably disposed with a lower portion of the lead screw 80 so that the lead screw 80 and piston rod 82 cooperate to act as the cylinder and piston rod, respectively, of a known shock strut for a landing gear. When utilized with a landing gear assembly, the linear motion of the lead screw 80 drives extension and retraction of the landing gear assembly, while motion of the piston rod 82 relative to the lead screw 80 absorbs and dissipates shock loads.

As shown in FIG. 2, the motor 52 has an output shaft 54 that is selectively rotatable in both directions. The output shaft 54 is coupled to the transmission 60 to provide rotational input to the transmission. In some embodiments, the motor 52 is a stepper motor. In some embodiments, the motor 52 is a servo motor. In some embodiments, the motor 52 is any motor with suitable torque, responsiveness, precision control capability, and durability.

The transmission 60 includes an input gear 62 coupled to the output shaft 54 of the motor 52 so that rotation of the output shaft 54 rotates the input gear 62. In the embodiment of FIG. 2, the transmission 60 further includes an idler gear 66 in meshed engagement with the input gear 62 so that rotation of the input gear 62 drives rotation of the idler gear 66. A drive gear 70 is in meshed engagement with the idler gear 66. Accordingly, the output shaft 54 of the motor 52, the input gear 62, and the drive gear 70 all rotate in the same direction.

Still referring to FIG. 2, the drive gear 70 is coaxial with and fixedly coupled to a nut 72. The nut includes internal threads 74 engaging external threads 84 of the lead screw 80. Accordingly, rotation of the drive gear 70 rotates the nut 72, which in turn translates the lead screw 80 and, thus, the piston rod 82.

In some embodiments, the lead screw 80 has a trapezoidal thread, i.e., the lead screw is an acme screw. In some embodiments, the lead screw 80 has a square thread. In some embodiments, the lead screw 80 is a ball screw. In some embodiments the lead screw 80 is any suitable linear actuator that has external threads to convert rotational motion to linear motion.

In the illustrated embodiment, the input gear 62, idler gear 66, and drive gear 70 are helical gears mounted to parallel shafts. In some embodiments, these gears are spur gears or any other suitable type of gears to convert rotary input of the motor 52 into linear motion of the lead screw 80. Further, in some embodiments, bevel gears and the like are included so that the shafts of various gears in the transmission 60 are not parallel. In some embodiments, the transmission 60 includes any suitable number of type gears with various orientations.

During operation, the translation of the lead screw 80 can be determined theoretically according to the rotation of the output shaft 54 of the motor 52. Because the geometry of the various gears in the transmission 60 is known, a theoretical translation of the lead screw 80 can be calculated for a given rotation of the output shaft 54 of the motor 52. However, in practice, the geometrical defects and manufacturing tolerances result in differences between theoretical calculations and actual performance. These deviations between the actual geometry and the theoretical geometry introduce "backlash" into the system.

Figure 3:
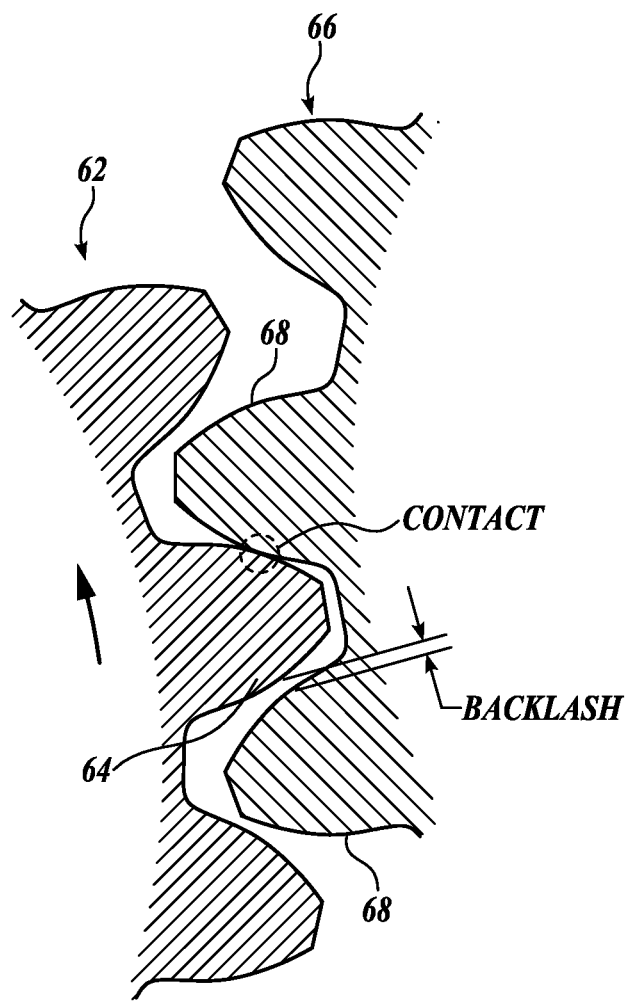
FIG. 3 shows a partial cross-sectional view of a pair of helical gears of the drive system as indicated in FIG. 2.

FIG. 3 shows backlash that can occur between helical gears. Input gear 62 and idler gear 66, which are both helical gears, include teeth 64 and 68, respectively, in meshed engagement. With the input gear 62 rotating in the indicated direction, a tooth 64 of the input gear 62 contacts a tooth 68 of the idler gear 66 at the indicated contact point. As shown in FIG. 3, when the teeth 64 and 68 are so engaged, a gap exists between tooth 64 and the next tooth on of the idler gear. Similarly, when a pair of gears are unloaded, the system may "relax" so that the contact at point is not maintained. As a result, when the input gear 62 initially rotates there may be a delay before contact is re-established between the teeth 64 and 68 of the gears. Because of this delay, the rotation of the idler gear 66 does not immediately begin to rotate when the input gear 62 begins to rotate, and rotation of the idler gear 66 cannot accurately be determined using just the input gear 62 rotation and associated gear ratio. The "backlash" caused by these gaps introduces undesirable inaccuracies into theoretically calculated gear positions, which therefore outputs inaccurate linear position of the lead screw.

Figure 4:
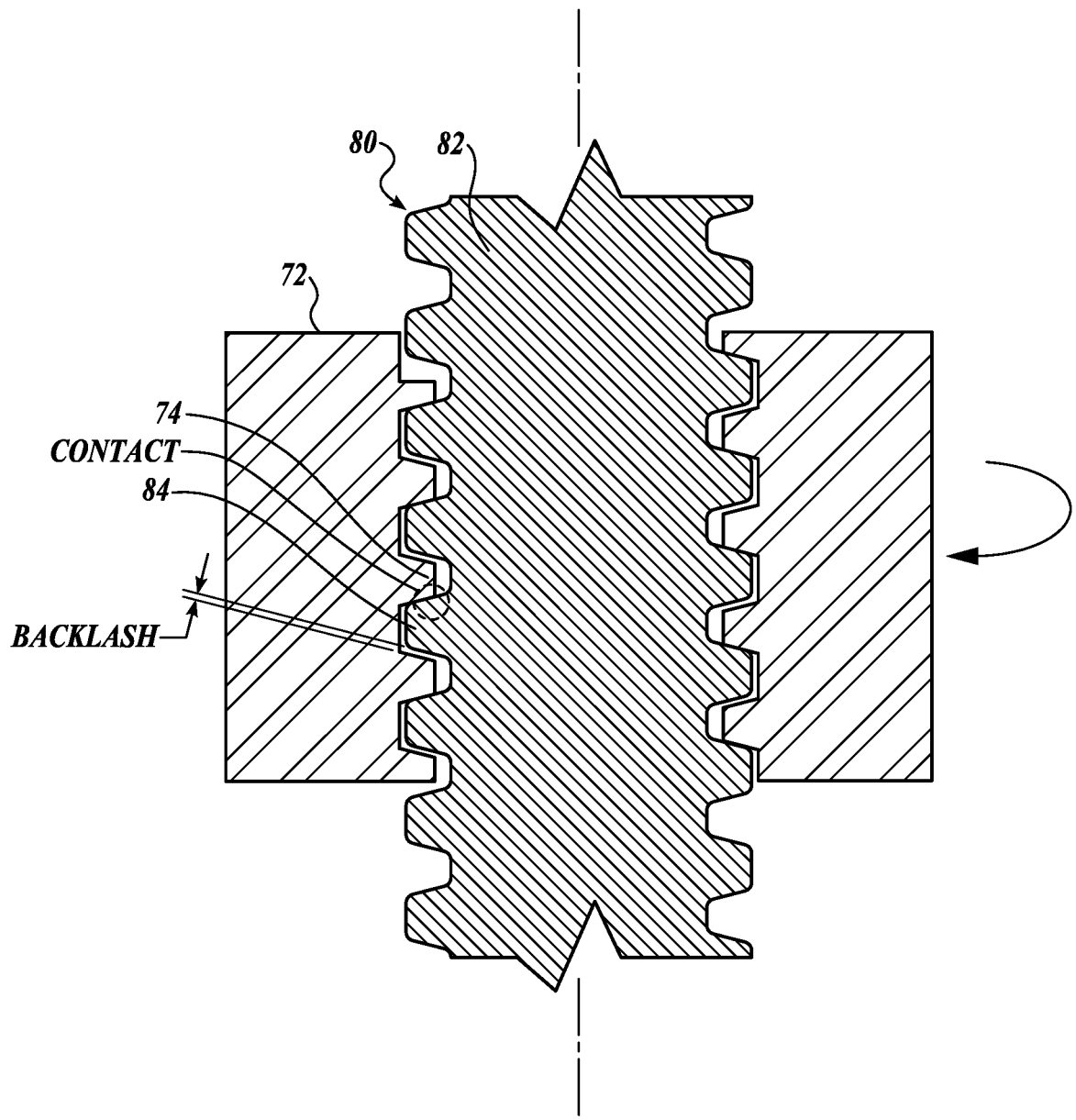
FIG. 4 shows a partial cross-sectional view of a lead screw and a nut of the drive system as indicated in FIG. 2.

FIG. 4 shows backlash that can occur between the lead screw 80 and the nut 72. When the nut 72 rotates to drive translation of the lead screw 80, the internal threads 74 of the nut 72 engage the external thread 84 of the lead screw 80 such that a given internal thread 74 of the nut 72 contacts an adjacent portion of external thread 84 of the lead screw 80 at the indicated location, and a gap exists between the internal threads 74 of the nut 72 and the other adjacent portion of the external thread 84 of the lead screw 80. As described above with respect to the spur gears, because of the gap, translation of the lead screw 80 cannot be accurately determined using only the rotation of the nut 72 without accounting for backlash.

In certain applications, accurately determining screw position is essential. For example, some maglev transportation systems utilize landing gear with drive systems 50 such as the one shown in FIG. 2. Precise and timely extension and retraction of the landing gear is important to ensure the landing gear position corresponds to the mission profile of the maglev system. Some maglev systems also include active height control systems that continuously extend and retract the landing gear to maintain a target height in the presence of external influences, such as track faults, bumps, etc.

While systems that eliminate or reduce backlash are possible, such systems are complicated and more expensive. Further, in the case of spur gears in particular, backlash helps reduce friction and breakaway torque. Accordingly, it can be preferable to allow for a certain amount of backlash and then account for that backlash when determining lead screw position.

Figure 5:
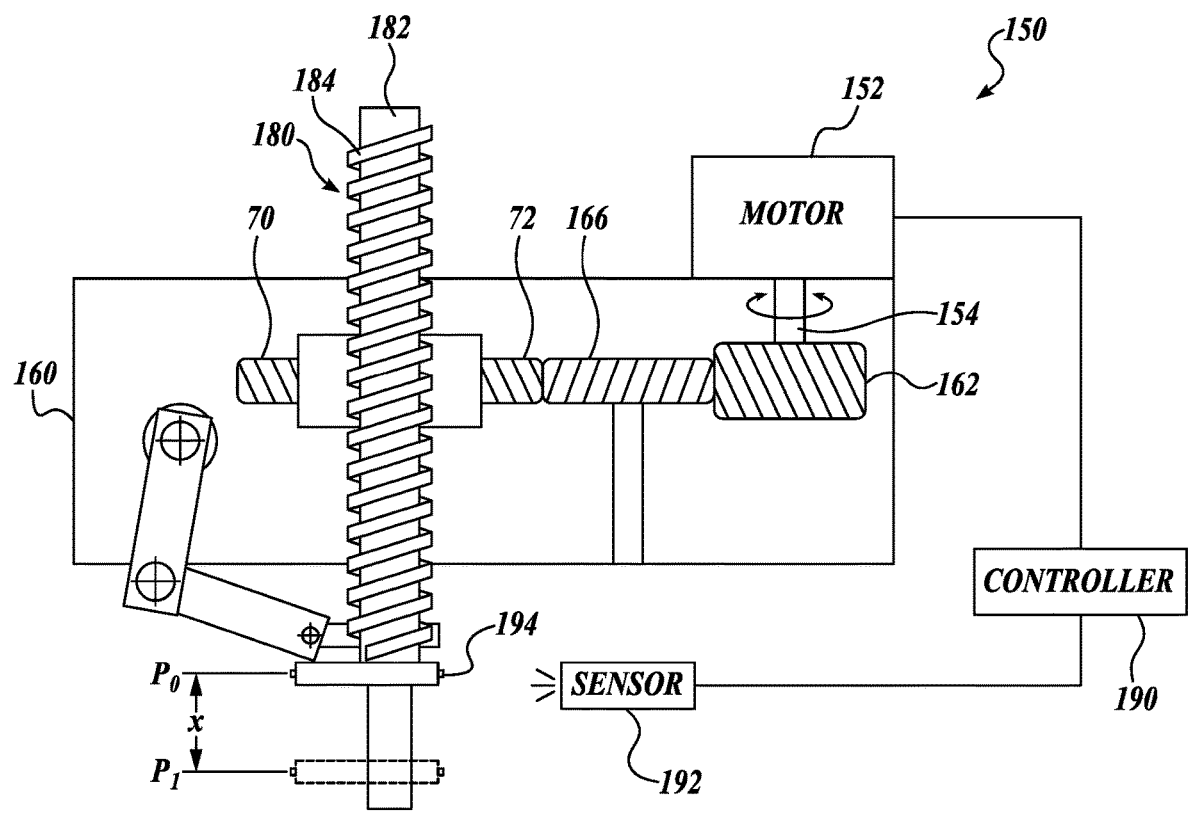
FIG. 5 shows a schematic view of an embodiment of a drive system according to the present disclosure.

FIG. 5 shows an embodiment of a drive system 150 that determines screw position according to motor rotation while also accounting for backlash. The drive system 150 is similar to the previously described drive system 50 of FIG. 2, wherein parts of the drive system 150 indicated with reference number 1XX correspond to parts of the drive system 50 indicated with reference number XX except as otherwise noted. For example, input gear 162 of FIG. 5 is similar in form and function to input gear 62 of FIG. 2 except as noted. For the sake of brevity, components of the drive system 150 will not be described again with the understanding that the description of the corresponding component of previously described drive system 50 applies.

The drive system 150 of FIG. 5 includes a transmission 160 that converts rotary input from a motor 152 to drive translating motion of a lead screw 180. The drive system 150 further includes a position sensor 192 configured to sense the actual position of the lead screw 180 at any given time. In the illustrated embodiment, the sensor 192 is a position sensor that senses the position of a target 194 mounted to the lead screw 180. In some embodiments, the target 194 is mounted to any structure that has a fixed position relative to the lead screw 180 or from which the position of the lead screw 180 can be determined. In some embodiments, the sensor 192 is any suitable sensor configured to measure the actual position of the lead screw 180 directly or indirectly.

A controller 190, such as a control unit or control circuit, is in operative communication with the sensor 192 and is configured to receive signals from the sensor 192 corresponding to the position of the lead screw 180. The controller 190 is also in operative communication with the motor 152 and is programmed to operate the motor 152 according to the methods disclosed herein.

In some embodiments, the controller 190 includes a processor and memory. The memory may include computer readable storage media in read-only memory (ROM), random-access memory (RAM), and keep-alive memory (KAM), for example. The KAM may be used to store various operating variables or program instructions while the processor is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the terms "module" and "unit" can include logic that may be implemented in either hardware or software, or combinations thereof.

In some embodiments, the processor of the controller 190 executes instructions stored in memory. These instructions may include, for example, a set of algorithms, including resident program instructions stored in one of the storage mediums and executed to provide desired functions. In some embodiments, the set of instructions, when executed by the processor, is configured to carry out the functionality of the controller 190 controller described above. In that regard, the processor and/or memory story program instructions form a special purposed controller or control circuit specifically configured to carry out the methodologies and technologies described herein. In some embodiments, the controller 190 carries out, for example, the method 200 set forth in FIG. 6 and/or the method 300 set forth in FIG. 7.

As the disclosed methods are being carried out, data from the sensor 192 is collected and used to determine backlash of the drive system 150. More specifically, the sensor 192 measures the actual lead screw 180 position at any time. An expected lead screw 180 position is calculated based on the rotation of the output shaft 154 of motor 152 combined with known geometric characteristics of the transmission 160 and the lead screw 180. That is, a theoretical lead screw 180 travel corresponds to a given rotation of the output shaft 154 of the motor 152. Backlash is determined by calculating the difference between the actual lead screw 180 travel, as measured by the sensor 192, and the theoretical lead screw 180 travel, calculated according to output shaft 154 rotation. With the backlash of the system determined, the drive system 150 is calibrated to account for backlash so that theoretical lead screw 180 position is accurately corresponds to actual lead screw 180 position. As a result, the position of the lead screw 180 can be accurately controlled by controlling rotation of the output shaft 154 of the motor 152 without undue inaccuracies being introduced by backlash.

Figure 6:
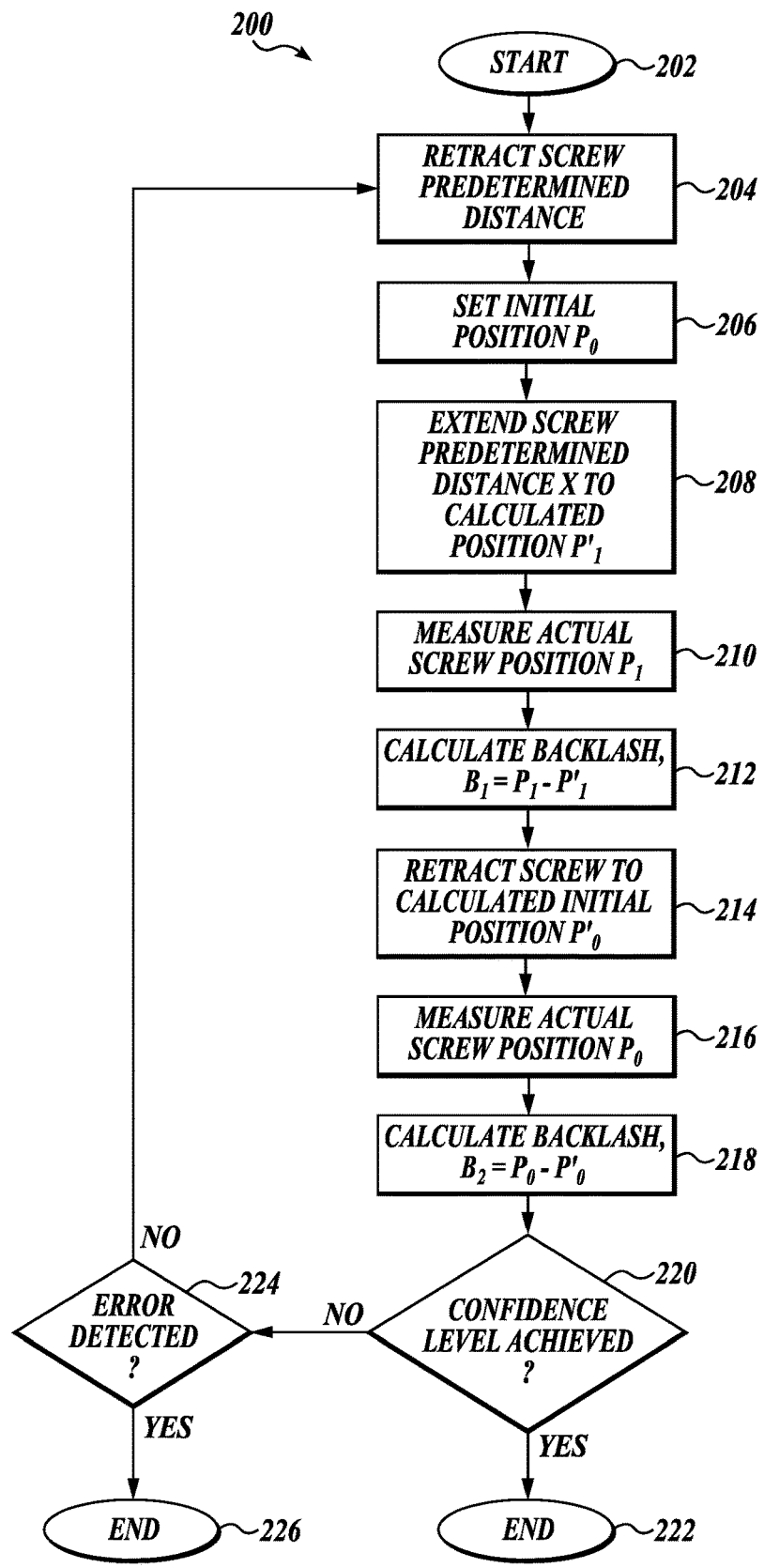
FIG. 6 shows an embodiment of a method for determining the backlash of the drive system of FIG. 5.

Referring now to FIG. 6, a first embodiment of a method 200 for measuring backlash in a drive system, such as the drive system 150 of FIG. 5, is shown. The method 200 starts at block 202 and proceeds to block 204. In block 204, the controller 190 controls the motor 152 (e.g., the controller 190 sends suitable control signals to the motor 152) to retract the lead screw 180 a predetermined distance. In some embodiments, the controller 190 controls the motor 152 to rotate the output shaft 154 a predetermined number of rotations, for example, two rotations or any other suitable number of rotations. In some embodiments, the controller 190 determines the position of the lead screw 180 based on signals received from the sensor 192 and retracts the lead screw 180 by controlling the motor 152 to rotate the output shaft 154 until signals from the sensor 192 indicate that the lead screw 180 has traveled the predetermined distance. The method 200 then proceeds to block 206.

In block 206, the controller 190 sets an initial position $P_0$ of the lead screw 180 to be the position of the lead screw 180 sensed by the sensor 192. That is, $P_0$ is considered to be the actual initial position of the lead screw 180. The method 200 then proceeds to block 208.

In block 208, the controller 190 controls the motor 152 to extend the lead screw 180 a predetermined distance X from the actual initial position $P_0$ to a calculated position $P'_1$. To extend the lead screw 180, the controller 190 controls the motor 152 to rotate the output shaft 154 a calculated number of rotations that corresponds to translating the lead screw 180 the predetermined distance X. The method 200 then proceeds to block 210.

In block 210, the sensor 192 senses the actual position $P_1$ of the lead screw 180 and sends a signal corresponding to the actual position $P_1$ to the controller 190. The method then proceeds to block 212, wherein the controller 190 calculates a first backlash value $B_1$ according to the following equation:

$$B_1 = P_1 - P'_1 \qquad \text{Eq. (1)}$$

The method 200 proceeds to block 214, wherein the controller 190 controls the motor 152 to retract the lead screw 180 a predetermined distance X to a calculated initial position $P'_0$. To extend the lead screw 180, the controller 190 controls the motor 152 to rotate the output shaft 154 a calculated number of rotations that corresponds to translating the lead screw 180 the predetermined distance X from the actual position $P_1$. The method 200 then proceeds to block 216.

In block 216, the sensor 192 senses the actual initial position $P_0$ of the lead screw 180 and sends a signal corresponding to the actual initial position $P_0$ to the controller 190. The method 200 then proceeds to block 218, wherein the controller 190 calculates a second backlash value $B_2$ according to the following equation:

$$B_2 = P_0 - P'_0 \qquad \text{Eq. (2)}$$

Next, in block 220, the method 200 determines if a desired confidence level has been achieved. In an embodiment, the confidence level is determined by obtaining a sample of backlash values $B_1$ and $B_2$. A standard deviation of the sample is calculated after each of a predetermined number of iterations of the steps shown in block 204 through block 218. If the standard deviation of the sample decreases with each successive iteration of the predetermined number of iterations, then the desired level of confidence can be considered reached. In some embodiments, the predetermined number of iterations is 3, 5, 10, 20 or any other suitable number of iterations. If the confidence level has been achieved, the mean value of the sample is determined to be the backlash of the drive system 150, and the method 200 proceeds to block 222 and ends. If the confidence level has not been achieved, the method 200 proceeds to block 224.

In block 224, the controller 190 determines if the sample of backlash values $B_1$ and $B_2$ indicates that an error is present. In an embodiment, an error is determined to be present, the standard deviation of successive iterations calculated in block 220 increases. In an embodiment, an error is determined to be present if one more of the sample of backlash values $B_1$ and $B_2$ is greater than a predetermined value. The presence of a backlash value greater than a predetermined value can potentially indicate that an error has been made on a design level or with respect to gear ratios values used by the controller 190. In one example, the motor 152 and/or the transmission 160 may have been replaced by another motor and/or transmission with different characteristics during typical maintenance service or repair. If the controller 190 is not updated to account for the characteristics of the replacement part, the predicted backlash may be larger than can be reasonably expected.

If an error is determined to be present, the method 200 proceeds to block 226 and ends. In such cases, further investigation is conducted to determine the cause of the error and implement corrective action.

If an error is not determined to be present, then the method 200 proceeds back to block 204, and the method 200 continues until a confidence level is achieved in block 220 or an error is detected in block 224.

Figure 7:
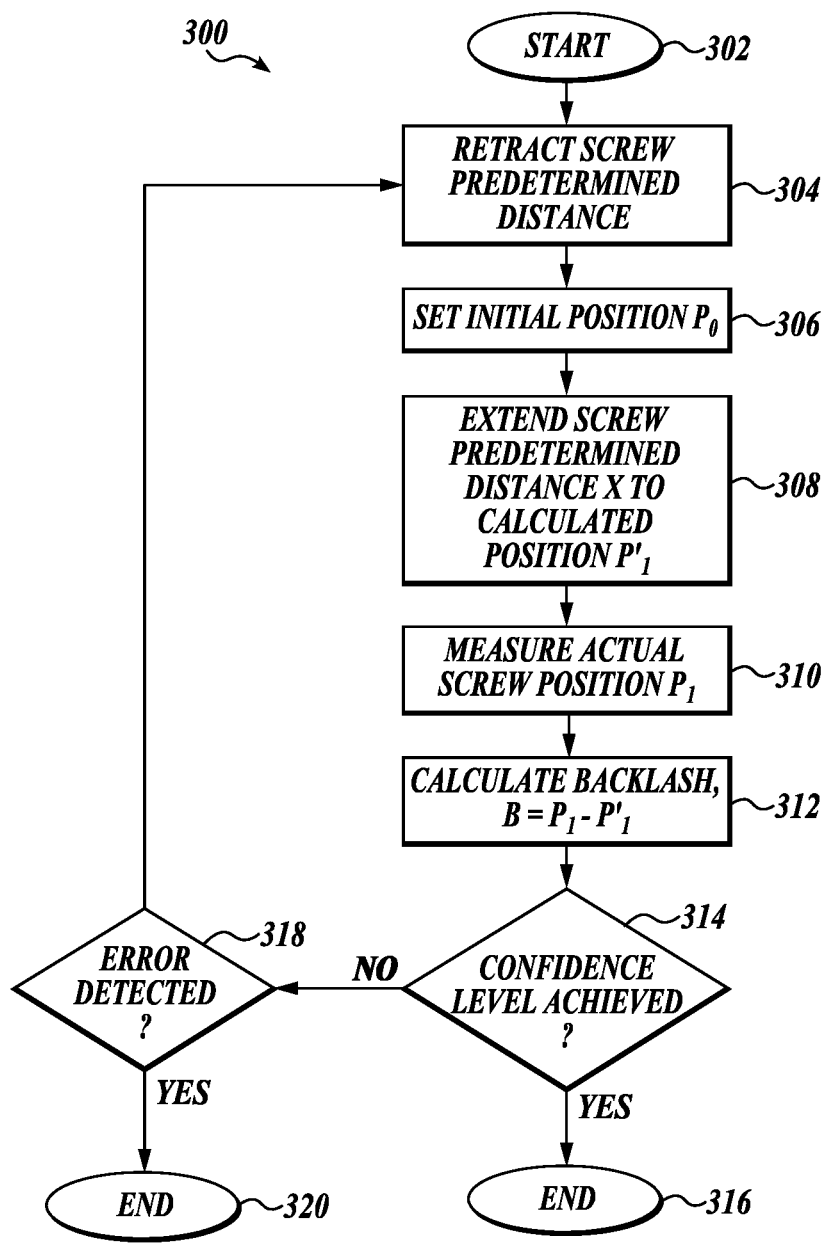
FIG. 7 shows another embodiment of a method for determining the backlash of the drive system of FIG. 5.

FIG. 7 shows a second embodiment of a method 300 for measuring backlash in a drive system, such as the drive system 150 of FIG. 5. The method 300 is similar to the previously described method 200 except that the backlash calculations are only conducted after an extension of the lead screw 180, thereby providing an alternate method for generating a sample of backlash values.

The method 300 starts at block 302 and proceeds to block 304. In block 304, the controller 190 controls the motor 152 to retract the lead screw 180 a predetermined distance. In some embodiments, the controller 190 controls the motor 152 to rotate the output shaft 154 a predetermined number of rotations, for example, two rotations or any other suitable number of rotations. In some embodiments, the controller determines the position of the lead screw 180 from the sensor 192 and controls retraction of the lead screw 180 by controlling the motor 152 to rotate the output shaft 154 until signals from the sensor 192 indicate that the lead screw 180 has traveled the predetermined distance. The method 300 then proceeds to block 306.

In block 306, the controller 190 sets an initial position $P_0$ of the lead screw 180 to be the position of the lead screw 180 sensed by the sensor 192. That is, $P_0$ is considered to be the actual initial position of the lead screw 180. The method 300 then proceeds to block 308.

In block 308, the controller 190 controls the motor 152 to extend the lead screw 180 a predetermined distance X from the actual initial position $P_0$ to a calculated position $P'_1$. To extend the lead screw 180, the controller 190 controls the motor 152 to rotate the output shaft 154 a calculated number of rotations that corresponds to translating the lead screw 180 the predetermined distance X. The method 300 then proceeds to block 310.

In block 310, the sensor 192 senses the actual position $P_1$ of the lead screw 180 and sends a signal corresponding to the actual position $P_1$ to the controller 190. The method 300 then proceeds to block 312, wherein the controller 190 calculates a backlash value B according to the following equation:

$$B = P_1 - P'_1 \qquad \text{Eq. (3)}$$

Next, in block 314, the method 300 determines if a desired confidence level has been achieved. In an embodiment, the confidence level is determined by obtaining a sample of backlash values B. A standard deviation of the sample is calculated after each of a predetermined number of iterations of the steps shown in block 304 through block 312. If the standard deviation of the sample decreases with each successive iteration of the predetermined number of iterations, then the desired level of confidence is considered to be achieved. In some embodiments, the predetermined number of iterations is 3, 5, 10, 20 or any other suitable number. If the confidence level has been achieved, the mean value of the sample is determined to be the backlash of the drive system 150, and the method 300 proceeds to block 316 and ends. If the confidence level has not been achieved, then method 300 proceeds to block 318.

In block 318, the controller 190 determines if the sample of backlash values indicates that an error is present. In some embodiments, the determination is carried out in the manner previously described with respect to block 224 of method 200. For the sake of brevity, this step will not be described again.

If an error is determined to be present, the method 300 proceeds to block 320 and ends. In such cases, further investigation is conducted to determine the cause of the error and implement corrective action.

If an error is not determined to be present, then the method 300 proceeds back to block 304, and the method 300 continues until a confidence level is achieved in block 314 or an error is detected in block 318.

The disclosed systems and methods provide for the determination of the backlash of a drive system 150 by collecting data based on the operation of the drive system 150. With the backlash of the drive system 150 determined, the controller 190 can be calibrated to account for backlash. With the controller calibrated, the extension and retraction of the lead screw 180 can be quickly and accurately provided by controlling the motor 152 to rotate the output shaft 154 by an amount and in a direction corresponding to the distance and direction, respectively, that the lead screw 180 is to be driven.

The disclosed embodiments refer to extension and retraction of the lead screw 180. In some embodiments, the disclosed methods can be carried out by instead (1) extending the lead screw 180 when the described method indicates retracting the lead screw and (2) retracting the lead screw 180 when the described method indicates extending the lead screw.

Certain embodiments disclosed herein utilize circuitry (e.g., one or more circuits) in order to implement standards, protocols, methodologies or technologies disclosed herein, operably couple two or more components, generate information, process information, analyze information, filter signals, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A method for determining a backlash of a drive system having a motor having a rotatable output shaft that is operably coupled to a lead screw by a transmission that converts rotary output of the motor into axial translation of the lead screw, the drive system further including a position sensor configured to sense a position of the lead screw, the method comprising the steps of:

sensing an initial position;
driving the lead screw in a first axial direction to a calculated second position by controlling the motor to rotate the output shaft an amount that corresponds to a distance between the initial position and the calculated second position;
sensing an actual second position of the lead screw; and
determining a backlash value according to a difference between the calculated second position and the actual second position.

2. The method of claim 1, further comprising the step of driving the lead screw a predetermined distance in a second axial direction before the step of sensing the initial position.

3. The method of claim 1, further comprising repeating the steps of claim 1 to determine a plurality of backlash values.

4. The method of claim 3, further comprising the step of determining a confidence level according to the plurality of backlash values.

5. The method of claim 4, wherein the step of determining the confidence level comprises calculating a standard deviation of the plurality of backlash values.

6. The method of claim 5, wherein the standard deviation is calculated after each backlash value is determined.

7. The method of claim 6, wherein the confidence level is achieved when each of a predetermined number of subsequent standard deviations decreases relative to the previous standard deviation.

8. The method of claim 1, further comprising the steps of:
driving the lead screw in a second axial direction to a second calculated initial position by controlling the motor to rotate the output shaft an amount that corresponds to a distance between the actual second position and the second calculated initial position;
sensing an actual second initial position of the lead screw; and
determining a second backlash value according to a difference between the calculated second initial position and the actual second initial position.

9. The method of claim 8, wherein the initial position and the calculated second initial position are the same.

10. The method of claim 8, further comprising repeating the steps of claim 7 to determine a plurality of backlash values.

11. The method of claim 10, further comprising the step of determining a confidence level according to the plurality of backlash values.

12. A drive system, comprising:
a motor having a rotatable output shaft;
a transmission operably coupled to the output shaft;
a lead screw operably coupled to the transmission, wherein the transmission converts rotary output of the motor into axial translation of the lead screw;
a position sensor configured to sense a position of the lead screw; and
a controller configured to control rotation of the output shaft of the motor and to receive signals from the sensor corresponding to the position of the lead screw, the controller being programmed to:
sense an initial position;
extend the lead screw to a calculated second position by controlling the motor to rotate the output shaft an amount that corresponds to a distance between the initial position and the calculated second position;
sense an actual second position of the lead screw; and
determine a backlash value according to a difference between the calculated second position and the actual second position.

13. The drive system of claim 12, wherein the lead screw is an acme screw.

14. The drive system of claim 12, the drive system further comprising a target mounted to the lead screw, the position sensor being configured to sense a position of the target.

15. A maglev vehicle, comprising a landing gear with the drive system of claim 12, wherein axial translation of the lead screw drives extension and retraction of the landing gear.

* * * * *